(12) United States Patent
Nishio et al.

(10) Patent No.: US 8,074,636 B2
(45) Date of Patent: Dec. 13, 2011

(54) WARM AIR FURNACE

(75) Inventors: Kazunori Nishio, Nagoya (JP); Hayato Mizouchi, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 266 days.

(21) Appl. No.: 12/485,610

(22) Filed: Jun. 16, 2009

(65) Prior Publication Data
US 2009/0314275 A1     Dec. 24, 2009

(30) Foreign Application Priority Data
Jun. 18, 2008   (JP) .................. 2008-158787

(51) Int. Cl.
*F24H 3/06* (2006.01)
(52) U.S. Cl. ................... 126/116 A; 126/99 R; 126/112
(58) Field of Classification Search ............ 126/116 A, 126/99 R, 112, 116 R
See application file for complete search history.

(56) References Cited

U.S. PATENT DOCUMENTS
6,089,221 A * 7/2000 Mano et al. ............... 126/116 A FOREIGN PATENT DOCUMENTS
JP   08-189708   7/1996
JP   11-023064   1/1999
* cited by examiner

*Primary Examiner* — Alfred Basichas
(74) *Attorney, Agent, or Firm* — Rankin, Hill & Clark LLP

(57) ABSTRACT

A warm air furnace capable of reliably carrying out a fuel consumption conserving operation regardless of a heating load is equipped with an ecology operation setting unit for setting a saving operation function and a moderate operation function. The saving operation function makes a target temperature setting unit decrease a target temperature by a first predetermined temperature after a lapse of a predetermined time after a room temperature reaches the target temperature. The moderate operation function limits a target combustion amount when the room temperature is higher than the target temperature by a second predetermined temperature or more. An eco-operation switch is capable of turning the ecology operation setting unit on and off.

18 Claims, 7 Drawing Sheets

WARM AIR FURNACE

BACKGROUND OF THE INVENTION

1. Field of the Invention

The present invention relates to a warm air furnace, and to be more specific, relates to a warm air furnace enabling fuel consumption conserving operation.

2. Description of the Related Art

For example, in a gas fan heater which is a warm air furnace, a gas burner and an air blow fan are equipped inside a body case, in which the heater operation is carried out by elevating the room temperature by drawing in the indoor air by the rotational operation of the air blow fan, and blowing the air heated by the gas burner into the room. Generally, the warm air furnace includes a temperature adjustment function, and a combustion amount at the gas burner and an air blow amount of the air blow fan are adjusted so that a target temperature set by the user using a temperature setting switch approximately coincide with the actual room temperature detected by a room temperature sensor provided in the vicinity of an air inlet of the indoor air.

With the rise in the environmental consciousness of the user and from the purpose of reduction in heating cost, the warm air furnace is required to conduct heater operation while conserving fuel consumption. As one type of such warm air furnace, there is known a warm air furnace equipped with a saving operation function (also known as a fuel consumption conserving operation function) (for example, refer to Japanese Patent Application Laid-Open No. H8-189708). In this type of warm air furnace, the target temperature is decreased slightly, accompanying a lapse of time after the room temperature reaches the target temperature. To be more specific, there is a type in which the target temperature is decreased by 1° C. after a lapse of 30 minutes from the time when the room temperature reaches the target temperature, and the target temperature is further decreased by 1° C. after a lapse of further 30 minutes. The sensory temperature of the user does not change greatly, even when the target temperature is decreased slightly as is described above. Therefore, by conducting the saving operation, it is possible to reduce the combustion amount of the gas burner, and obtain fuel consumption conserving effect without making the user feel uncomfortable.

Apart from the warm air furnace in which the target temperature is decreased each time by a predetermined temperature, there is a warm air furnace in which a decreasing amount of the target temperature is varied in accordance to the magnitude of the heating load, for example the decreasing amount of the target temperature during the saving operation is varied in accordance with the room temperature at the commencement of the heating operation and the increasing amount of the room temperature after commencement of heating operation.

On the other hand, there is known a warm air furnace equipped with a moderate operation function (also known as on/off operation function). This is a function for assisting the temperature adjustment function, by interrupting the combustion operation of the gas burner in the case where the temperature detected by the room temperature sensor continues to increase even when the combustion amount of the gas burner is decreased to its minimum, so as to prevent excessive heating and to make the room temperature approximately coincide with the target temperature. To be more specific, when the room temperature becomes higher than the target temperature by a predetermined temperature or more, the combustion operation of the gas burner is stopped, and thereafter combustion operation of the gas burner is resumed when the room temperature decreases to a heating resume temperature set near the target temperature.

Further, there is known a warm air furnace enabling simultaneous use of the saving operation and the moderate operation (refer to Japanese Patent Application Laid-Open No. H11-23064). This type of warm air furnace is equipped with two switches enabling setting of the on/off of the saving operation function and the moderate operation function independently from each other, and the user is free to select and set the on/off of each function.

However, there are cases where the fuel consumption conserving effect cannot be obtained even when the saving operation or the moderate operation is carried out, depending on the situation such as a heating load. That is, even though the saving operation is carried out, in the case where the heating load is smaller than the heating capacity of the gas burner in the minimum combustion amount, the fuel consumption conserving effect is not sufficient because it is not possible to decrease the heating capacity any more. On the other hand, even though the moderate operation is carried out, when the room temperature becomes higher than the set temperature, the combustion operation of the gas burner is not interrupted in the case where the heating load is larger than the heating capacity of the gas burner in the minimum combustion amount, the fuel consumption conserving effect is not sufficient. Further, it is difficult for the general user to set appropriate operating function in accordance with the situation such as the heating load.

SUMMARY OF THE INVENTION

In view of such circumstances, an object of the present invention is to provide a warm air furnace capable of reliably conducting the fuel consumption conserving operation, notwithstanding the condition such as the heating load.

In order to achieve the above object, the present invention provides a warm air furnace, comprising: a heating source; an air blow fan which blows out the air heated by the heating source into a room; a temperature sensor which detects the room temperature; a set temperature input unit which inputs a set temperature; a target temperature setting unit for setting the set temperature input to the set temperature input unit as an initial target temperature; a heating mount decision unit which decides a heating mount of the heating source, so that a detected temperature by the temperature sensor coincide with the target temperature; an ecology operation setting unit which sets a saving operation function of making the target temperature setting unit set the target temperature decreased by a first predetermined temperature, after lapse of a predetermined time from the time when the detected temperature reaches the target temperature, and sets a moderate operation function of limiting the heating amount of the heating source, when the detected temperature is higher than the target temperature by a second predetermined temperature or more, until the detected temperature decreases to a heating resume temperature which is in a predetermined correspondence to the target temperature; and an ecology operation setting input unit which is capable of setting on and off of the ecology operation setting unit.

According to the warm air furnace of the present invention, when the ecology operation setting unit is set to on by the ecology operation setting input unit, the saving operation function and the moderate operation function (hereinafter collectively referred to as "ecology operation function") are set. Therefore, it is possible to reliably carry out the fuel consumption conserving operation notwithstanding the situation such as the heating load, so that it is not necessary for the user to set the operation function in accordance with the situation such as the heating load. For example, in the case where the heating load is smaller than the heating capacity of the heating source in the minimum heating amount, the fuel consumption conserving operation is carried out by limiting the heating amount of the heating source when the room temperature becomes higher than the target temperature by the second predetermined temperature or more. Further, when the room temperature becomes higher than the set temperature, and the heating load is larger than the heating capacity of the heating source in the minimum heating amount, the fuel consumption conserving operation is carried out by decreasing the target temperature by the first predetermined temperature.

Here, "making the target temperature setting unit set the target temperature decreased by a first predetermined temperature, after lapse of a predetermined time from the time when the detected temperature reaches the target temperature" means to make the target temperature setting means carry out a setting of decreasing the target temperature by the first predetermined temperature uniquely determined previously in correspondence to the predetermined time, after the lapse of the predetermined time determined previously from the time when the detected temperature reaches the target temperature. Further, the combination of the predetermined time and the first predetermined temperature may be one or plural. Still further, a limit may be set to the range of decrease in temperature from the initial target temperature. Still further, the predetermined time is a cumulated time from the time when the detected temperature reaches the target temperature, and the target temperature in this regard may be the initial target temperature set by the target temperature setting unit or may be the target temperature decreased by a predetermined temperature from the initial target temperature by the ecology operation setting unit.

Further, "the heating resume temperature which is in a predetermined correspondence to the target temperature" means that the heating resume temperature is uniquely set in accordance with the target temperature. The heating resume temperature is set near the target temperature by a predetermined method such as making the same identical to the target temperature, making the same increase or decrease by a minute predetermined temperature, for example 0.5° C., from the target temperature, and the like. Further, the heating resume temperature may be set by taking into consideration the external temperature, the increase rate of the room temperature or the like.

Further, "limits the heating amount of the heating source" means to suppress the heating amount of the heating source than the heating amount generally decided by the heating amount decision unit. For example, such includes interrupting the heating by setting the heating amount of the heating source to 0, intermittently heat by setting the heating amount of the heating source intermittently to 0, decrease the heating amount of the heating source decided by the heating amount decision unit by half, and the like.

Further, in the warm air furnace according to the present invention, it is preferable that when the ecology operation setting unit limits the heating amount of the heating source, the target temperature setting unit maintains the target temperature until the detected temperature decreases to or below the heating resume temperature.

In this case, it is possible to dissolve the following disadvantage generated in the case where the heating load is small such as when the difference between the external temperature and the room temperature is small in early spring, in the case where the saving operation and the moderate operation are used simultaneously as referring to Japanese Patent Application Laid-Open No. H11-23064. That is, with the moderate operation, after the heating by the heating source (gas burner) stops when the room temperature becomes equal to or more than the target temperature by the second predetermined temperature, the room temperature gradually decreases. However, there are cases where the decrease of the room temperature is slower than the decrease in the target temperature by the saving operation. In such case, when the heating of the heating source is stopped for a long period of time without the room temperature reaching the heating resume temperature, there is a disadvantage that the user may believe a defect had occurred at the warm air furnace. Therefore, in the case where the ecology operation setting unit limits the heating amount of the heating source, the target temperature setting unit maintains the target temperature and does not decrease the target temperature, until the room temperature decreases to or lower than the heating resume temperature. As such, when the decrease in the room temperature after limiting the heating amount of the heating source is slow, the target temperature is not decreased even after a lapse of the predetermined time from the time when the room temperature reaches the target temperature, until the room temperature has decreased to or below the heating resume temperature. Therefore, it is possible to reliably dissolve the disadvantage that the user believe a defect had occurred at the warm air furnace by limiting the heating of the heating source for a long time without the room temperature reaching the heating resume temperature.

DETAILED DESCRIPTION OF THE PREFERRED EMBODIMENTS

An embodiment of a warm air furnace A according to the present invention will be now described in further detail with reference to FIG. 1 through FIG. 4.

Figure 1:
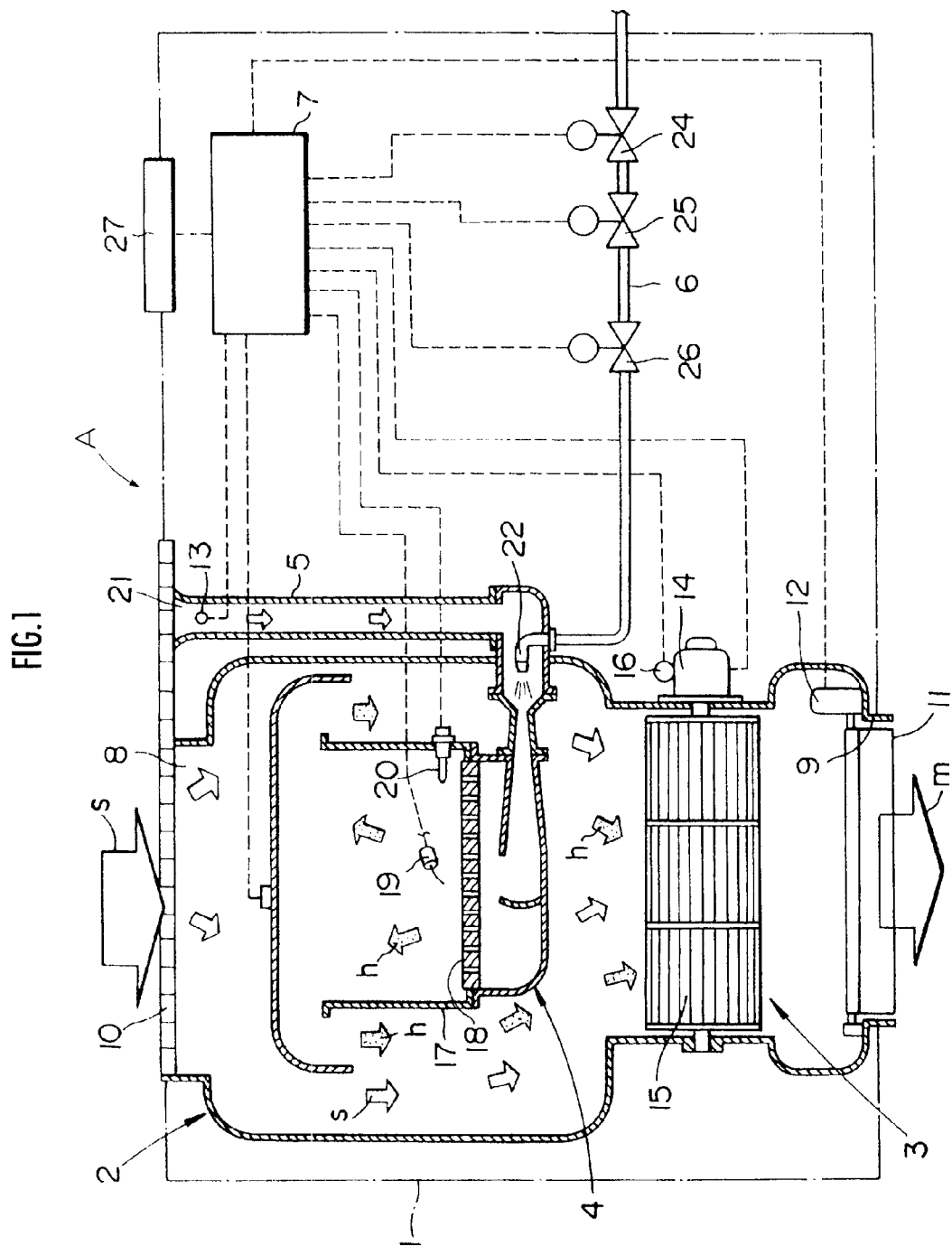
FIG. 1 is an overall structural view of a warm air furnace according to an embodiment of the present invention.

With reference to FIG. 1, the warm air furnace A is equipped with a duct 2, an air blow fan 3, a gas burner (heating source) 4, an air intake duct 5, a gas supply pipe 6, and a control unit 7 accommodated inside a body case 1 arranged inside a room.

The duct 2 constitutes an air blow path of the warm air, and has an air inlet 8 for introducing an indoor air "s" opened at the rear surface of the body case 1, and an air outlet 9 for warm air at the bottom of the front surface of the body case 1. To the air inlet 8, there is detachably fixed an air filter 10 for preventing dust, dirt and the like from entering the duct 2. To the air outlet 9, there is fixed a movable louver 11 for adjusting the opening degree thereof. The movable louver 11 is driven by a geared motor 12.

The air blow fan 3 includes a fan motor 14 which changes the number of revolutions thereof in proportion to the energized electric current, and a rotary impeller 15 rotationally driven by the fan motor 14. The rotary impeller 15 is arranged inside the duct 2 in facing relationship to the air outlet 9. The air blow fan 3 draws in the indoor air "s" from the air inlet 8 into the duct 2 by the rotation of the rotary impeller 15, mixes the drawn-in indoor air "s" with a combusted air "h" of the gas burner 4 which is installed inside the duct 2, and blows out the same as a warm air "m" from the air outlet 9 to the inside of the room. To the air blow fan 3, there is provided a revolution sensor 16 constituted from a hall element or the like for detecting the number of revolutions of the fan motor 14. The revolution sensor 16 outputs a signal corresponding to the number of revolutions of the fan motor 14 to the control unit 7.

The gas burner 4 installed inside the duct 2 is disposed with a combustion plate 18 inside of a combustion trunk 17 thereof, and is disposed with an ignition electrode 19 for igniting the mixed gas of combusting air and the fuel gas to the vicinity of the combustion plate 18. The combusted air "h" of the gas burner 4 is discharged to the inside of the duct 2 from the combustion trunk 17. Further, to the downstream side of the combustion plate 18, there is disposed a thermocouple 20 for detecting the existence or nonexistence of the combustion flame. When exposed to the combustion flame of the gas burner 4, the thermocouple 20 generates a thermoelectric power corresponding to the temperature of the combustion flame, and outputs the thermoelectric power to the control unit 7.

The air intake duct 5 is a path for supplying the indoor air (the combusting air) "s" and the fuel gas to the gas burner 4. The air intake duct 5 connects the gas burner 4 and the inside of the combustion trunk 17, and also is installed inside of the body case 1 so as to connect to the duct 2, and is equipped with an air inlet 21 of the indoor air "s" opened at the rear surface of the body case 1. Further, at the point on the side of the gas burner 4 of the air intake duct 5, there is provided a nozzle 22 fixed to a tip end of the gas supply pipe 6. To the air intake duct 5, the indoor air "s" is drawn in from the air inlet 21 by the rotational operation of the air blow fan 3, the drawn-in indoor air "s" is mixed with the fuel gas injected from the nozzle 22 of the gas supply pipe 6, and the mixed air is supplied to the gas burner 4. Here, the air inlet 21, together with the air inlet 8 of the duct 2, is covered by the air filter 10.

Further, at the point inside the air intake duct 5 near the air inlet 21, there is fixed a temperature sensor 13 constituted from a thermistor in facing relationship to the air inlet 21. The temperature sensor 13 outputs signal indicating a room temperature (a detected temperature) Tr detected periodically to the control unit 7, during heater operation of the warm air furnace A.

To the gas supply pipe 6, there are provided, in the order from the upstream side thereof, solenoid valves 24, 25, and an electromagnetic proportional valve 26. The solenoid valves 24, 25 open the valve upon energization from the control unit 7. When the energization is stopped, the solenoid valves 24, 25 changes to a valve closed state, and blocks the fuel gas from passing therethrough. The electromagnetic proportional valve 26 is a valve which increases its opening along with the intensity of the energized electric current from the control unit 7, and controls the amount of supply of the fuel gas to the gas burner 4.

Figure 2:
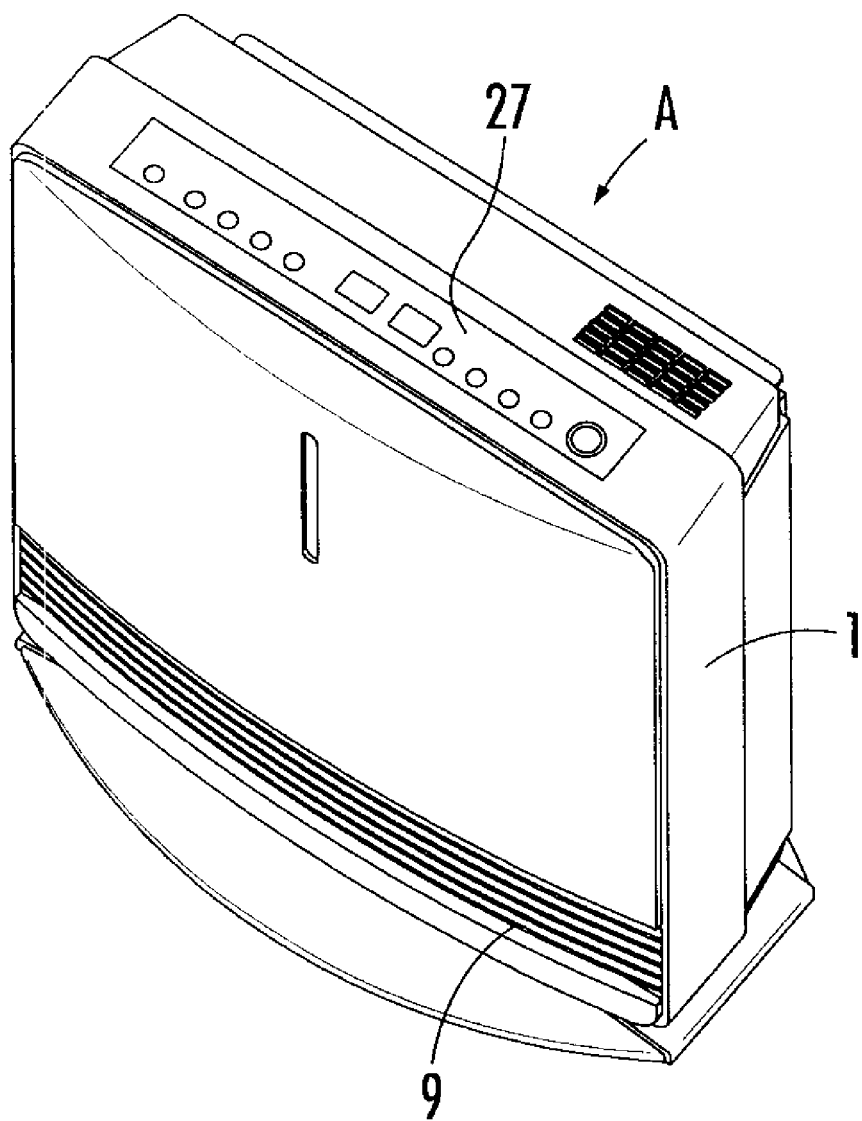
FIG. 2 is a perspective view of an overview of the warm air furnace.
Figure 3:
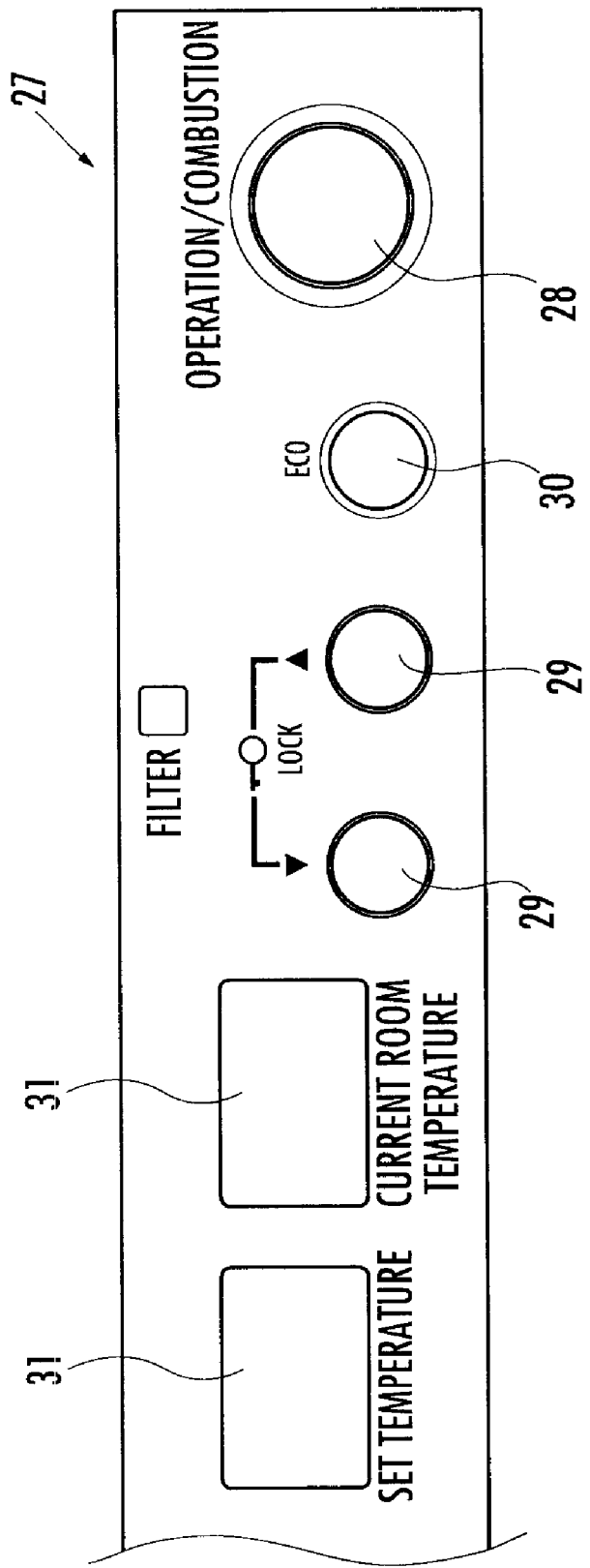
FIG. 3 is a partial planar view of an operational unit of the warm air furnace.

With reference to FIG. 2 and FIG. 3, to the external surface of the body case 1, there is provided an operational panel 27. To the operational panel 27, there are provided various switches such as an operation switch 28, a temperature setting switch (a set temperature input unit) 29, and an ecology operation (hereinafter referred to as "eco-operation") switch (a setting input unit) 30, and a display unit 31. To the circumference of the operation switch 28 and the eco-operation switch 30, respectively, there is provided a luminescent unit, which emits light in accordance with the turning on of the switch, so that the user may confirm the on/off setting state thereof.

The operation switch 28 outputs a signal indicating the on/off of a main power switch, which is not shown, of the warm air furnace A to the control unit 7, with the turning on/off by the user. The temperature setting switch 29 is a switch for setting a desired room temperature, and a set temperature Ta is set for example by being increased/decreased by 1° C. with a predetermined operation by the user. The temperature setting switch 29 outputs a signal indicating the set temperature Ta to the control unit 7.

The eco-operation switch 30 is a switch for setting an ecology operation function which unified a saving operation function and a moderate operation function, and outputs a signal indicating the existence or nonexistence of the eco-operation function setting to the control unit 7 by the turning on/off by the user. Here, the saving operation function is a function for automatically decreasing a target temperature Tt by a predetermined temperature (a first predetermined temperature) $\Delta T1$, after the time when the room temperature Tr reaches the set temperature Ta. Further, the moderate operation function is a function for automatically controlling the on/off of the heater operation at the target temperature Tt.

The display unit 31 is comprised of a liquid crystal panel, a digital indicator or the like, and displays the current room temperature Tr detected by the temperature sensor 13, the set room temperature Ta set via the temperature setting switch 29, and the like.

Figure 4:
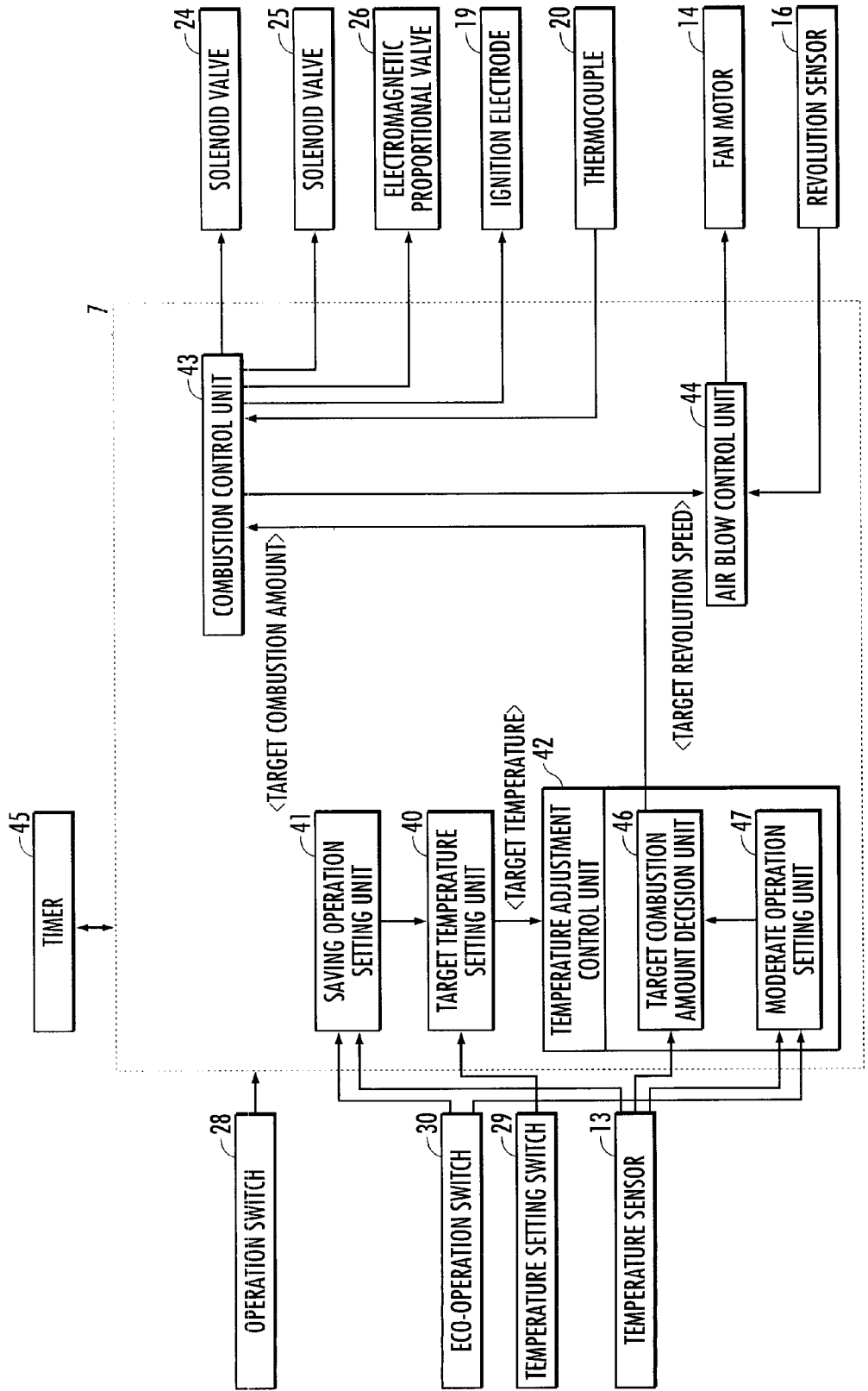
FIG. 4 is a control block diagram of the warm air furnace.

With reference to FIG. 4, the control unit 7 is constituted using a microcomputer and the like, and is equipped with a target temperature setting unit 40, a saving operation setting unit 41, a temperature adjustment control unit 42, a combustion control unit 43, and an air blow control unit 44. Further, a timer 45 is connected to the control unit 7.

The target temperature setting unit 40 sets the target temperature Tt of the heater operation, from the set temperature Ta initially set by the temperature setting switch 29, and from the setting by the saving operation setting unit 41.

When the eco-operation switch 30 is turned on, in order to carry out the fuel consumption conserving operation, the saving operation setting unit 41 sets the saving operation function for decreasing the target temperature Tt by the predetermined temperature $\Delta T1$, after a lapse of a predetermined time $\Delta t$ lapsed from the time when the room temperature Tr reaches the target temperature Tt, to the target temperature setting unit 40. The saving operation setting unit 41, here, outputs a setting command to the target temperature setting unit 40 for decreasing the target temperature Tt by 1° C., respectively, after a lapse of 30 minutes and 1 hour from the time when the room temperature Tr reaches the target temperature Tt, that is, for every lapse of the predetermined time $\Delta t$ (30 min). Here, the saving operation setting unit 41 decreases the target temperature Tt a predetermined times, for example twice, and cumulatively decreases the temperature by 2° C. at the maximum for this case.

The temperature adjustment control unit 42 carries out control such that the target temperature Tt set by the target temperature setting unit 40 approximately coincide with the room temperature Tr detected by the temperature sensor 13. The temperature adjustment control unit 42 is equipped with a target combustion amount decision unit (a heating mount decision unit) 46 and a moderate operation setting unit 47.

The target combustion amount decision unit 46 decides the target combustion amount (the heating amount) of the gas burner 4 such that the target temperature Tt approximately coincide with the room temperature Tr.

When the eco-operation switch 30 is turned on, in order to prevent excessive heating, the moderate operation setting unit 47 sets the moderate operation function for automatically interrupting the combustion of the gas burner 4 to the target combustion amount decision unit 46. By the target combustion amount decided by the target combustion amount decision unit 46, typically, the room temperature Tr stabilizes in a range of approximately 0.5° C. from the target temperature Tt. However, in the case where the target temperature Tt is low or the like, the room temperature Tr continues to increase even where the combustion amount of the gas burner 4 is set to its minimum. And when the room temperature Tr reaches an operation interruption temperature (a heating interruption temperature) Tc higher than the target temperature Tt by a predetermined temperature (the second predetermined temperature) ΔT2, for example by 2° C., the moderate operation setting unit 47 conducts setting of a so-called on/off control. That is, the moderate operation setting unit 47 sets the target combustion amount of the gas burner 4 to 0 so as to interrupt the combustion operation of the gas burner 4, and resumes the combustion operation of the gas burner 4 when the room temperature Tr decreases to an operation resuming temperature (a heating resume temperature) Ts corresponding to the target temperature Tt. The operation resuming temperature Ts corresponds to the target temperature Tt, and is set to the vicinity of the target temperature Tt. In this case, the operation resuming temperature Ts is set to be the same as the target temperature Tt. Further, when the combustion operation of the gas burner 4 is interrupted, the saving operation setting unit 41 does not output the setting for decreasing the target temperature Tt to the target temperature setting unit 40, and the target temperature setting unit 40 maintains the target temperature Tt until the room temperature Tr decreases to or lower than the operation resuming temperature Ts.

An eco-operation setting unit is constituted from the saving operation setting unit 41 and the moderate operation setting unit 47.

The combustion control unit 43 carries out control of igniting/extinguishing, adjusting the combustion amount (adjusting the supply amount of fuel gas) and the like of the gas burner 4, so that the gas burner 4 combusts at the target combustion amount decided by the target combustion amount decision unit 46. This control is conducted by controlling the energization of the solenoid valves 24, 25 or the electromagnetic proportional valve 26 provided at the gas supply pipe 6, and the ignition electrode 19. Further, the combustion control unit 43 conducts confirmation of the ignition/extinction of the gas burner 4, and detection of an accidental extinction during combustion, from the output from the thermocouple 20.

The air blow control unit 44 controls the amount of electric current supplied to the fan motor 14, so that the fan motor 14 rotates at a target revolution speed corresponding to the combustion amount of the gas burner 4 (the target revolution speed corresponding to the supply amount of the combusting air to the gas burner), which is set by the combustion control unit 43. That is, the air blow control unit 44 adjusts the amount of electric current supplied to the fan motor 14, so that the target revolution speed coincides with the actual revolution speed of the fan motor 14 detected by the revolution sensor 16.

Next, with reference to the flowchart of FIG. 5 and FIG. 6, the control operation of the warm air furnace A by the control unit 7 will now be explained below.

Figure 5:
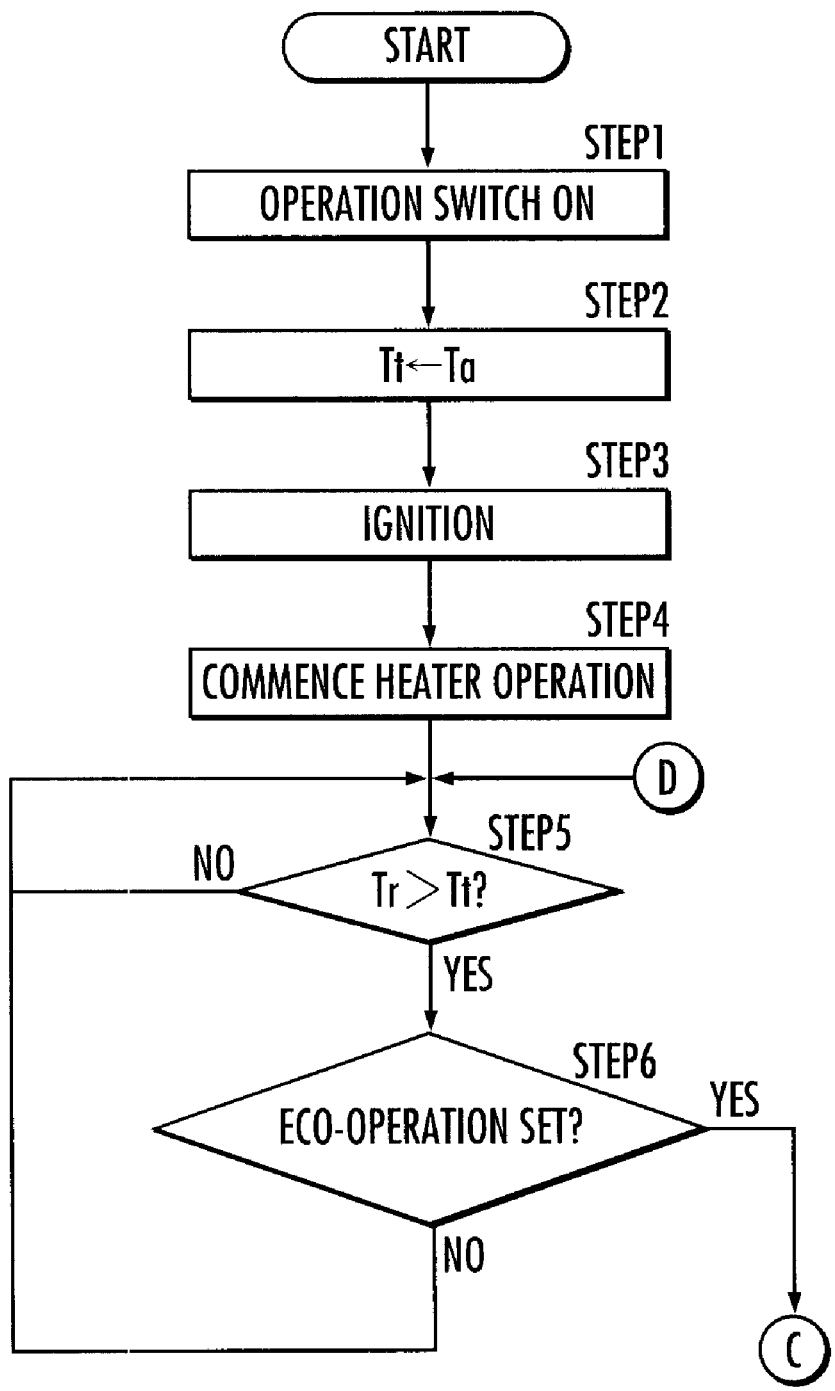
FIG. 5 is an actuation flow chart of the warm air furnace.
Figure 6:
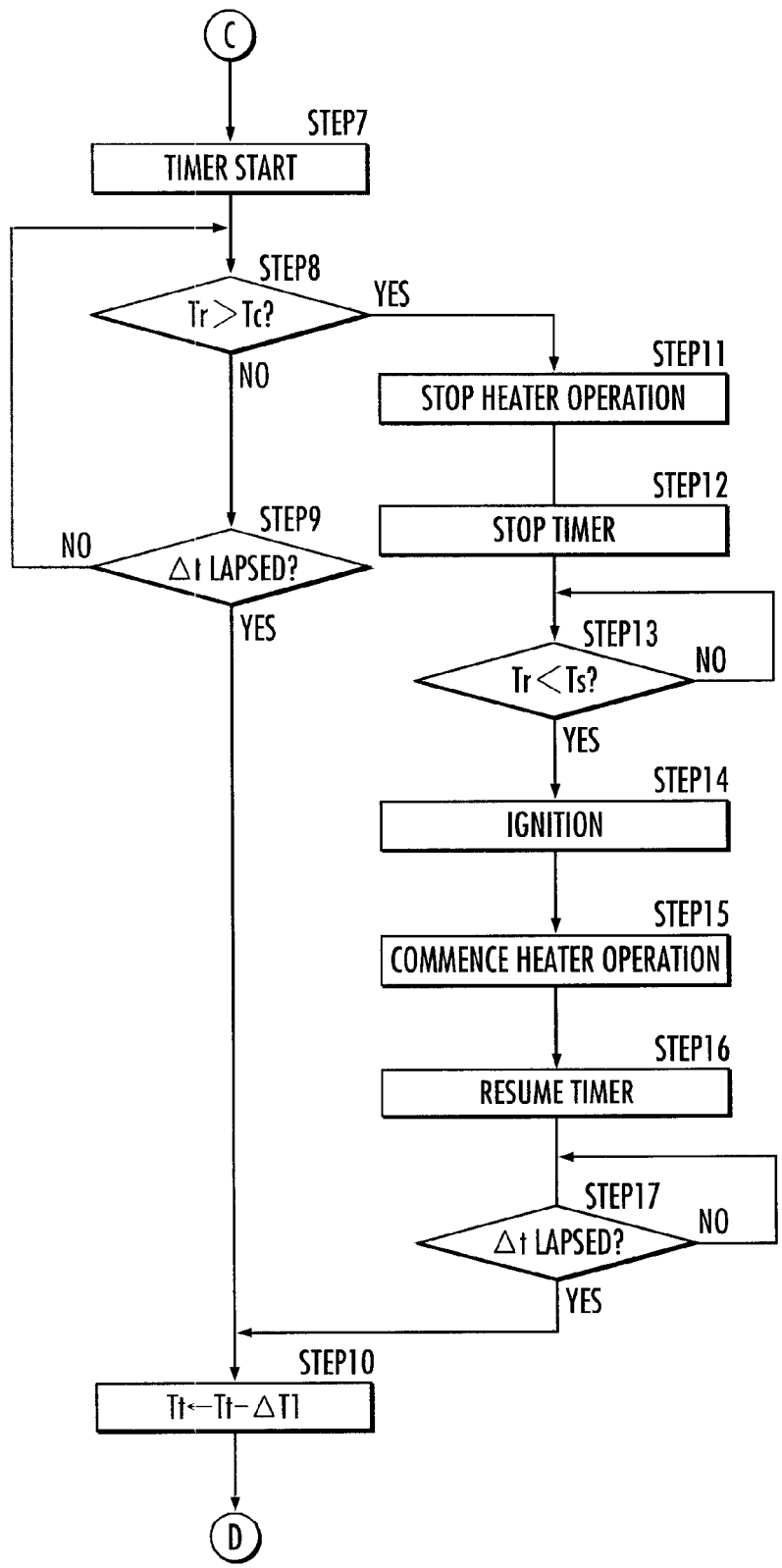
FIG. 6 is an actuation flow chart of the warm air furnace.

With reference to FIG. 5, when the user turns on the operation switch 28, the control operation of the warm air furnace A by the control unit 7 is commenced (STEP 1). Thereafter, the set temperature Ta set at the temperature setting switch 29 is input to the target temperature setting unit 40, and the target temperature setting unit 40 sets the set temperature Ta as the initial target temperature Tt of the heater operation (STEP 2).

Next, ignition of the gas burner 4 by the control unit 7 is performed (STEP 3). To be more specific, before carrying out combustion at the gas burner 4, the air blow control unit 44 carries out a prepurge by rotary operating the fan motor 14 for a predetermined time. Thereafter, after the combustion control unit 43 opens the solenoid valves 24, 25, and makes the opening of the electromagnetic proportional valve 26 maximum, and after the air blow control unit 44 makes the revolution speed of the fan motor 14 maximum, the ignition electrode 19 is energized so as to ignite the gas burner 4. When the combustion control unit 43 detects inflame of the gas burner 4 from the thermoelectric power level of the thermocouple 20 before lapse of a predetermined period of time, for example 30 seconds, from the commencement of energization of the ignition electrode 19, the heater operation at maximum combustion amount is continued for 1 minute. On the other hand, if the predetermined period lapsed before detecting inflame of the gas burner 4, it is determined as failure of inflame, and the heater operation is discontinued.

Next, the heater operation in which the temperature adjustment control unit 42 carries out temperature control is commenced (STEP 4). To be more specific, first, the target combustion amount decision unit 46 decides the target combustion amount of the gas burner 4 on the basis of the difference between the target temperature Tt set at the target temperature setting unit 40 and the room temperature Tr detected by the temperature sensor 13. Thereafter, the combustion control unit 43 varies the opening of the electromagnetic proportional valve 26 according to the decided target combustion amount. Further, the air blow control unit 44 varies the target revolution speed of the fan motor 14 according to the decided target combustion amount, and adjusts the amount of energization to the fan motor 14 so that the target revolution speed coincides with the actual revolution speed detected by the revolution sensor 16. By doing so, the heater operation with temperature control so that the room temperature Tr approaches the target temperature Tt is carried out. Thereafter, the room temperature Tr increases gradually, but the heater operation with temperature adjustment control by the temperature adjustment control unit 42 is continued (STEP 4) until it is determined that the room temperature Tr exceeds the target temperature Tt (STEP 5: NO).

When it is determined that the room temperature Tr exceeds the target temperature Tt (STEP 5: YES), the target combustion amount decision unit 46 decides the target combustion amount of the gas burner 4 to become the minimum amount, and determines whether or not the eco-operation function is set (STEP 6). To be more specific, it is determined on the basis of whether or not the eco-operation switch 30 is turned on.

When it is determined that the eco-operation function is not set (STEP 6: NO), the heater operation with temperature adjustment control by the temperature adjustment control unit 42 is continued without changing the target temperature Tt.

On the other hand, when it is determined that the eco-operation function is set (STEP 6: YES), timekeeping is commenced after resetting the timer 45, as shown in FIG. 6 (STEP 7). When the timekeeping of the timer 45 elapses the predetermined time Δt from commencement (STEP 9: YES), before it is determined that the room temperature Tr detected by the temperature sensor 13 exceeds an operation interruption temperature Tc set at the moderate operation setting unit 47 (STEP 8: NO), the saving operation setting unit 41 carries out setting of decreasing the target temperature Tt by the predetermined temperature ΔT1 (STEP 10). In accordance thereto, the operation interruption temperature Tc and the operation resuming temperature Ts are respectively decreased by the predetermined temperature ΔT1. Thereafter, the heater operation is carried out with the temperature adjustment control by the temperature adjustment control unit 42 so as to make the room temperature Tr approach the decreased new target temperature Tt. As such, when eco-operation is carried out, the control similar to the saving operation is conducted, when the room temperature Tr does not exceed the operation interruption temperature Tc. Therefore, after the room temperature Tr becomes higher than the set temperature Ta, and the heating load becomes larger than the heating capacity of the minimum target combustion amount of the gas burner 4, the fuel consumption conserving operation is carried out by the saving operation of decreasing the target temperature Tt.

On the other hand, when it is determined that the room temperature Tr exceeds the operation interruption temperature Tc (STEP 8: YES), the target combustion amount decision unit 46 decides the target combustion amount of the gas burner 4 to become 0, the gas burner is extinguished, the heater operation is stopped (STEP 11), and the timekeeping by the timer 45 is stopped (STEP 12). Therefore, in the case where the heating load becomes smaller than the heating capacity of the minimum target combustion amount of the gas burner 4, the fuel consumption conserving operation is carried out by the saving operation of extinguishing the gas burner 4 when the room temperature Tr exceeds the operation interruption temperature Tc.

Thereafter, the heater operation is interrupted and the timekeeping of the timer 45 is maintained, until it is determined that the room temperature Tr is equal to or lower than the operation resuming temperature Ts (STEP 13: NO). When it is determined that the room temperature Tr is equal to or lower than the operation resuming temperature Ts (STEP 13: YES), ignition of the gas burner 4 is performed just as in STEP 3 (STEP 14), heater operation is resumed just as in STEP 4 (STEP 15), and maintenance of the timekeeping of the timer 45 is released and the timekeeping is resumed (STEP 16). After resuming timekeeping, the process waits until the timekeeping of the timer 45 lapses the predetermined time Δt (STEP 17: NO). Then, when the timekeeping of the timer 45 lapses the predetermined time Δt (STEP 17: YES), the saving operation setting unit 41 carries out the setting of decreasing the target temperature Tt by the predetermined temperature ΔT1 (STEP 10). In accordance thereto, the operation interruption temperature Tc and the operation resuming temperature Ts are respectively decreased by the predetermined temperature ΔT1. Thereafter, the heater operation with the temperature adjustment control by the temperature adjustment control unit 42 so as to make the room temperature Tr approach the decreased new target temperature Tt. As such, when eco-operation is carried out, the target temperature Tt, the operation interruption temperature Tc and the operation resuming temperature Ts do not decrease until the room temperature Tr becomes equal to or lower than the operation resuming temperature Ts.

Figure 7:
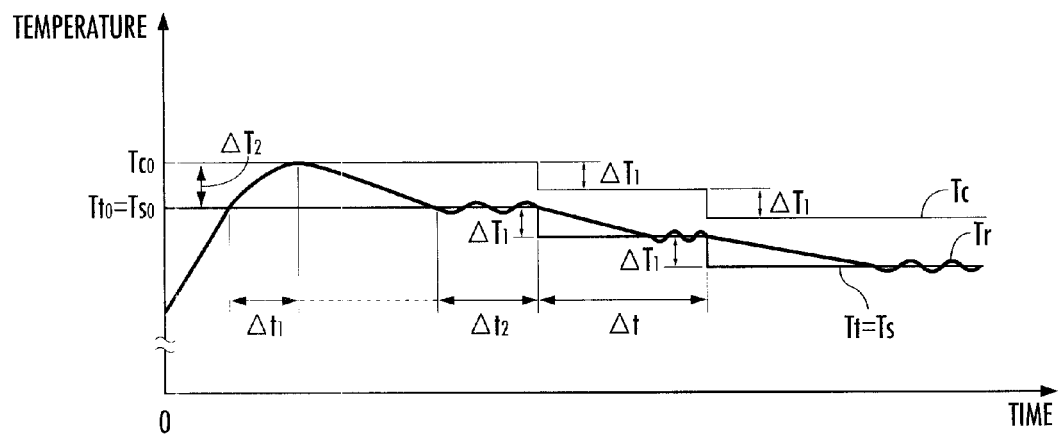
FIG. 7 is a graph showing a temperature difference of the warm air furnace during eco-operation.

FIG. 7 is a graph showing the temperature change of the warm air furnace A by the control of the control unit 7. In the figure, Tto is also the set temperature Ta set at the temperature setting switch 29, and is the initial target temperature Tt. Also, Tco is the initial operation interruption temperature Tc set by the moderate operation setting unit 47 by adding a predetermined temperature ΔT2 to the initial target temperature Tto. Here, the operation resuming temperature Ts is set to be the same as the target temperature Tt, so it is equal to the target temperature Tt.

Next, the change in temperature during eco-operation will be explained with reference to the graph in FIG. 7 and the flow charts in FIG. 5 and FIG. 6. When the heater operation is commenced (STEP 4), the room temperature Tr detected by the temperature sensor 13 increases gradually. When the room temperature Tr exceeds the initial target temperature Tto (STEP 5: YES), the timer 45 starts timekeeping (STEP 7). Thereafter, when the room temperature Tr exceeds the operation interruption temperature Tc (=Tto+ΔT2) (STEP 8: YES), the heater operation is interrupted (STEP 11), and the timekeeping by the timer 45 stops at Δt1 (STEP 12). Thereafter, the room temperature Tr decreases gradually, and when the same becomes equal to or lower than the operation resuming temperature Tso (=Tto) (STEP 13: YES), the heater operation is resumed (STEP 15), and the timekeeping by the timer 45 is resumed from Δt1 (STEP 16). Then, at the time when a time Δt2 lapses since resuming timekeeping of the timer 45, that is, at the time when the predetermined time Δt (=Δt1+Δt2) lapses (STEP 17), the target temperature Tt is decreased by the predetermined temperature ΔT1 (STEP 10). In connection thereto, the operation interruption temperature Tc and the operation resuming temperature Ts decreases by the predetermined temperature ΔT1, respectively. Therefore, when the heating load is small, such as when the difference between the external temperature and the room temperature Tr is small in early spring, the heating operation is not stopped for a long period of time, even when the decrease in temperature of the room temperature Tr is slow after interruption of the heater operation.

Figure 8:
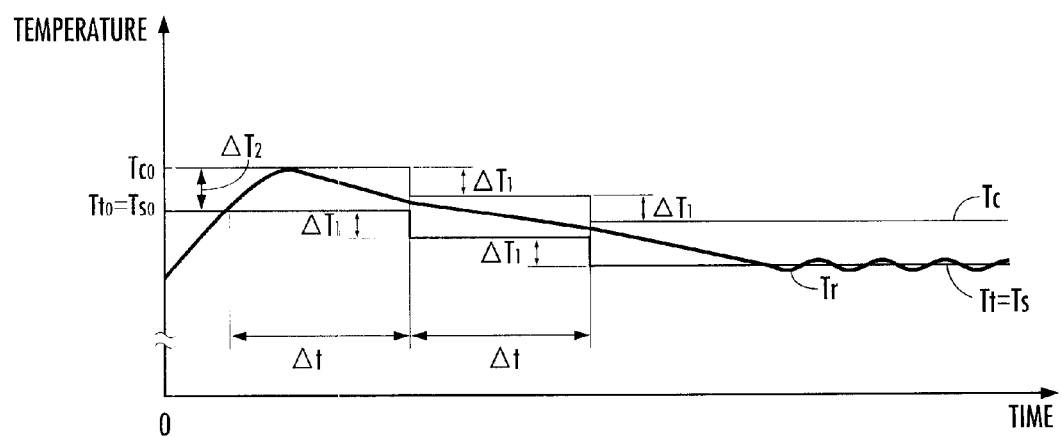
FIG. 8 is a graph showing a temperature difference of the conventional warm air furnace in the case where the saving operation and the moderate operation are used simultaneously.

On the other hand, when the saving operation and the moderate operation are used simultaneously in the conventional warm air furnace, even when the room temperature Tr does not decrease to or lower than the operation resuming temperature Tso, the target temperature Tt, the operation interruption temperature Tc and the operation resuming temperature Ts were decreased by the predetermined temperature ΔT1 after lapse of the predetermined time Δt the timer, as shown in FIG. 8. Therefore, there is a disadvantage that the heater operation is stopped for a long period of time without the room temperature Tr reaching the operation resuming temperature Ts, so that there is a possibility that the user believes a defect had occurred at the warm air furnace.

The embodiment of the present invention had been explained with reference to the drawings, however the present invention is not limited thereto. For example, in the above, a case where the warm air furnace A is equipped with the eco-operation switch 30 which is capable of setting on/off of the eco-operation function combining the saving operation function and the moderate operation function. However, it is not limited to a switch, as long as it is possible to set the eco-operation function. For example, it may be an element enabling the user to operate and set on/off of the eco-operation function, such as a key, a button, a dial, a touch panel, and a remote controller.

Further, in the above, the explanation is given to the case where the operation resuming temperature Ts is decreased by the predetermined temperature ΔT1, when the target temperature Tt is decreased by the predetermined temperature ΔT1. However, the operation resuming temperature Ts is determined so as to have a predetermined correspondence to the target temperature Tt, it is not necessary to decrease by the predetermined temperature ΔT1 equally to the target temperature Tt.

Further, in the above, the explanation is given to the case where the saving operation setting unit 41 decreases the target temperature Tt by the predetermined temperature ΔT1 at each lapse of the predetermined time Δt. However, the predetermined time Δt and the predetermined temperature ΔT1 may be different each time.

Further, in the above, the explanation is given to the case where, when the eco-operation function is set, the heating operation is interrupted when the room temperature Tr reaches the operation interruption temperature Tc which is higher than the target temperature Tt by the predetermined temperature ΔT2. However, it may be that, when the room temperature Tr reaches the operation interruption temperature Tc, the heater operation is intermittently operated, or that the interruption or an intermittent operation of the heating operation and the like is selected in accordance with the temperature difference between the room temperature Tr and the target temperature Tt.

Further, in the above, the explanation is given to the case where, when the eco-operation function is set, the timekeeping of the timer 45 is stopped and maintained when the room temperature Tr reaches the operation interruption temperature Tc, and then the maintaining of the timer 45 is released and the timekeeping is resumed when the room temperature Tr is equal to or lower than the operation resuming temperature Ts. However, it may be that the target temperature Tt is decreased by the predetermined temperature ΔT1, each time when the room temperature Tr becomes equal to or lower than the operation resuming temperature Ts at each lapse of the predetermined time Δt from the time when the room temperature Tr reaches the target temperature Tt. Further, it may be that the target temperature Tt is decreased by the predetermined temperature ΔT1 and the timer 45 is reset immediately, when the room temperature Tr becomes equal to or lower than the operation resuming temperature Ts when the timing by the timer 45 lapses the predetermined time Δt.

What is claimed is:

1. A warm air furnace, comprising:
   a heating source;
   an air blow fan which blows out air heated by the heating source into a room;
   a temperature sensor which detects the room temperature;
   a set temperature input unit which inputs a set temperature;
   a target temperature setting unit for setting the set temperature input to the set temperature input unit as an initial target temperature;
   a heating mount decision unit which decides a heating amount of the heating source, so that a detected temperature by the temperature sensor coincides with the target temperature;
   an ecology operation setting unit which sets a saving operation function of making the target temperature setting unit set the target temperature decreased by a first predetermined temperature, after lapse of a predetermined time from a time when the detected temperature reaches the target temperature, and sets a moderate operation function of limiting the heating amount of the heating source, when the detected temperature is higher than the target temperature by a second predetermined temperature or more, until the detected temperature decreases to a heating resume temperature which is in a predetermined correspondence to the target temperature; and
   an ecology operation setting input unit which is capable of setting on and off of the ecology operation setting unit,
   wherein when the ecology operation setting unit limits the heating amount of the heating source, the target temperature setting unit maintains the target temperature until the detected temperature decreases to or below the heating resume temperature.

2. The warm air furnace according to claim 1, wherein the ecology operation setting unit is configured to change the warm air furnace from an uninterrupted state to an interrupted state when the heating amount of the heating source is limited by the moderate operation function, and the saving operation function decreases the target temperature by the first predetermined temperature only when the warm air furnace is in the uninterrupted state.

3. The warm air furnace according to claim 1, wherein the ecology operation setting unit is configured to set the moderate operation function by controlling the heating mount decision unit to determine the heating amount of the heating source such that heating by the heating source is interrupted.

4. The warm air furnace according to claim 1, wherein the ecology operation setting unit is configured to set the saving operation function by controlling the target temperature setting unit to decrease the target temperature by the first predetermined temperature.

5. The warm air furnace according to claim 1, wherein the heating resume temperature equals the target temperature.

6. The warm air furnace according to claim 1, wherein the ecology operation setting unit is configured to set the saving operation function to decrease the heating resume temperature when the target temperature is reduced by the first predetermined temperature.

7. The warm air furnace according to claim 6, wherein the ecology operation setting unit is configured to set the saving operation function to decrease the heating resume temperature by the first predetermined temperature when the target temperature is reduced by the first predetermined temperature.

8. The warm air furnace according to claim 6, wherein the ecology operation setting unit is configured to set the saving operation function to maintain a predetermined correspondence between the target temperature and the heating resume temperature.

9. The warm air furnace according to claim 1, wherein the ecology operation setting unit is configured to repeatedly set the saving operation function.

10. The warm air furnace according to claim 9, wherein the ecology operation setting unit is configured to set at most a fixed number of iterations of the saving operation function.

11. The warm air furnace according to claim 10, wherein the fixed number of iterations is two.

12. The warm air furnace according to claim 1, further comprising a timer in communication with the ecology operation setting unit, the timer configured to measure a lapse of time from the time when the detected room temperature reaches the target temperature to determine if the predetermined time has lapsed, wherein the timer is configured to pause during limiting of the heating amount of the heating source by the moderate operation function.

13. A control unit for controlling a warm air furnace having a heating source and an air blow fan for blowing air heated by the heating source into a room, the control unit comprising:
- a temperature sensor configured to detect a room temperature of said room;
- a target temperature setting unit configured to set a target temperature;
- a combustion control unit configured to control a heating amount of the heating source such that the detected room temperature coincides with the target temperature;
- a moderate operation setting unit configured to control the combustion control unit to interrupt heating by the heating source when the detected room temperature is higher than the target temperature by at least a second predetermined temperature, and to maintain interruption of heating by the heating source until the detected room temperature decreases to a heating resume temperature which is in a predetermined correspondence to the target temperature; and
- a saving operation setting unit configured to control the target temperature setting unit to decrease the target temperature by a first predetermined temperature after lapse of a predetermined time from a time when the detected room temperature reaches the target temperature excepting periods during which heating by the heating source is interrupted by the moderate operation setting unit, during which time the target temperature is maintained.

14. The control unit according to claim 13, wherein the saving operation setting unit is configured to control the target temperature setting unit to maintain the target temperature while heating by the heating source is interrupted, and to maintain the target temperature until the detected room temperature decreases to or below the heating resume temperature.

15. The control unit according to claim 13, wherein the moderate operation setting unit is configured to decrease the heating resume temperature by the first predetermined temperature when the target temperature is reduced by the first predetermined temperature.

16. The control unit according to claim 13, wherein the moderate operation setting unit is configured to maintain a predetermined correspondence between the target temperature and the heating resume temperature.

17. The control unit according to claim 13, further comprising a timer in communication with the saving operation setting unit and the moderate operation setting unit, the timer configured to measure a lapse of time from the time when the detected room temperature reaches the target temperature to determine if the predetermined time has lapsed, wherein the timer is configured to pause during interruption of heating by the moderate operation setting unit.

18. The control unit according to claim 13, further comprising an ecology operation setting input unit configured to turn the saving operation setting unit and the moderate operation setting unit on and off.

* * * * *